(12) United States Patent
Konopka

(10) Patent No.: US 9,915,295 B2
(45) Date of Patent: Mar. 13, 2018

(54) DUAL TORQUE BAR DRUM ELEMENT

(71) Applicant: Eaton Corporation, Beachwood, OH (US)

(72) Inventor: Mark David Konopka, Rocky River, OH (US)

(73) Assignee: EATON CORPORATION, Beachwood, OH (US)

(*) Notice: Subject to any disclaimer, the term of this patent is extended or adjusted under 35 U.S.C. 154(b) by 436 days.

(21) Appl. No.: 14/252,335

(22) Filed: Apr. 14, 2014

(65) Prior Publication Data

US 2015/0292566 A1    Oct. 15, 2015

(51) Int. Cl.
| | |
|---|---|
| *F16D 25/04* | (2006.01) |
| *F16D 13/10* | (2006.01) |
| *F16D 49/00* | (2006.01) |
| *F16D 49/14* | (2006.01) |
| *F16D 121/08* | (2012.01) |

(52) U.S. Cl.
CPC ......... *F16D 13/10* (2013.01); *F16D 25/046* (2013.01); *F16D 49/00* (2013.01); *F16D 49/14* (2013.01); *F16D 2121/08* (2013.01)

(58) Field of Classification Search
CPC ...... F16D 65/06; F16D 65/065; F16D 65/067; F16D 25/04; F16D 25/042; F16D 25/046; F16D 25/12; F16D 49/12; F16D 49/14; F16D 49/18; F16D 2065/1356; F16D 2065/136
USPC .......................................................... 464/80
See application file for complete search history.

(56) References Cited

U.S. PATENT DOCUMENTS

| | | | | |
|---|---|---|---|---|
| 2,311,113 A | * | 2/1943 | Klocke | F16D 13/62 188/234 |
| 2,870,891 A | * | 1/1959 | Eakin | F16D 25/046 188/152 |
| 3,022,877 A | * | 2/1962 | Fawick | F16D 25/046 192/107 T |
| 3,173,526 A | * | 3/1965 | Eakin | F16D 25/046 192/48.615 |
| 3,173,527 A | * | 3/1965 | Eakin | F16D 25/046 188/152 |
| 3,777,868 A | * | 12/1973 | Sugahara | F16D 25/046 188/367 |
| 3,788,436 A | * | 1/1974 | Sugahara | F16D 25/046 188/367 |
| 4,190,136 A | * | 2/1980 | Collins | F16D 25/046 188/250 G |
| 8,905,216 B2 | * | 12/2014 | Young | F16D 25/046 188/366 |

(Continued)

*Primary Examiner* — Robert A. Siconolfi
*Assistant Examiner* — Stephen M Bowes
(74) *Attorney, Agent, or Firm* — Ralph E. Jocke; Walker & Jocke

(57) ABSTRACT

A constricting clutch brake element is operable to selectively transmit mechanical power between relatively movable rotating members. A plurality of backing plates are movably mounted and selectively movable radially on an annular body of the clutch brake element. The backing plates engage a plurality of friction linings. Each backing plate is configured for usage with different numbers of torques bars to meet different torque carrying capacities, all within the same envelope size. The configuration also allows plural torque bars to be relatively positioned so that they can engagingly guide the backing plate during its radial movement.

10 Claims, 12 Drawing Sheets

(56) References Cited

U.S. PATENT DOCUMENTS

2014/0224612 A1\* 8/2014 Boonpongmanee .. F16D 25/046
  192/79

\* cited by examiner

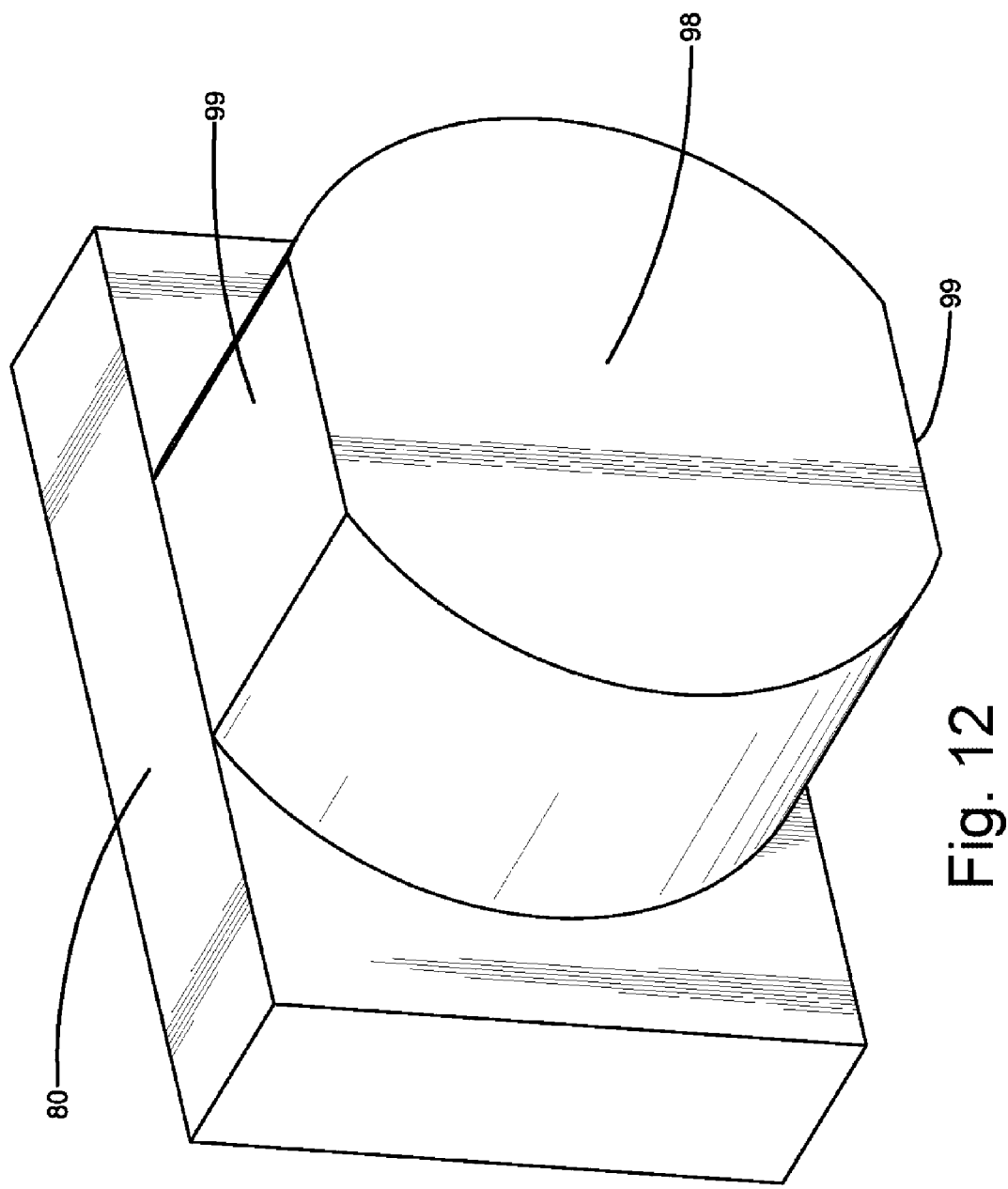

DUAL TORQUE BAR DRUM ELEMENT

TECHNICAL FIELD

The disclosure relates to mechanical power transmission products that selectively transmit power between relatively rotating members. The disclosure particularly relates to a constricting type clutch brake element that can handle greater torque and power.

BACKGROUND

Clutch brake elements are used to transmit power in a controlled manner between relatively moving members. In some arrangements a rotating driver member may transmit power to a driven member via a clutch brake element that can operate to engage and disengage the driving and driven members. The driving and driven members may be engaged by moving friction material, such as material on a friction lining operatively connected to a backing plate of the driving member, into a position where the driving member and the driven member are engaged via the friction material. Such engagement causes transmission of the rotational motion to the driven member, which will begin rotating in coordination with the driving member. Thereafter, when the driven member is to no longer be driven by the driving member, the friction material is moved to operatively disengage the members, and the driven member is no longer moved in response to the driving member.

Clutch brakes can also be used to stop unwanted rotation of a moving member. In such applications a body of a clutch brake can be fixed to a frame or other generally immovable structure. Rotation of a moving member is stopped or slowed by engagement of friction material, which is operatively connected with the body, and the moving member. Because the body which is engaged through the friction material is fixed, the moving member is slowed or stopped as desired. Once the rotating member is stopped, the ability to rotate it again can be achieved by disengaging the friction material and the rotating member.

In many applications, clutch brake elements are used both for the function of transmitting movement from a driving to a driven member, as well as to stop or slow the rotation of a driving or driven member when desired. One or more clutch brake elements may be used for each purpose based on their configuration.

Constricting clutch brake elements are a type of clutch brake that can be used in high power, high torque applications. In a constricting clutch brake element, a relatively rotatable member is operatively engaged and disengaged by moving backing plates radially inward relative to a body of the clutch brake element to achieve frictional engagement, and radially outward to achieve disengagement. Airflex® type VC clutch brake elements manufactured by Eaton Corporation are an example of constricting clutch brake elements that are utilized in many types of heavy equipment and high torque applications.

Clutch brake elements can include backing plates associated with torque bars. The torque bars allow transfer of torque (or power) between driving and driven members. Thus, clutch brake elements and associated backing plates may benefit from improvements.

SUMMARY OF DISCLOSURE

This application discloses an improved configuration for constricting clutch brake elements, and backing plates that can be used as a part of such elements. An improved element includes backing plates that can be respectively used with one or more torques bars. An exemplary backing plate arrangement allows its usage with different numbers of torques bars to meet different torque carrying capacities. The number of torques bars used with a particular backing plate is interchangeable. The backing plate is movably mounted and selectively movable radially on an annular body of the clutch brake element. The exemplary arrangement also allows for the torque bars to engagingly guide the backing plate during its radial movement.

An exemplary embodiment is directed to a clutch brake element which comprises a dual torque bar drum element. The element includes backing plates, torque bars, and an expandable tube. Each backing plate includes a plurality of guide cavities. Two of the guide cavities of a backing plate have a torque bar extending therein. The dual torque bar ability allows for transfer of higher torque. A release spring is located between each of the two torque bars and a respective guide cavity wall. Each spring is operable to provide a radially outward biasing force to the backing plate. In the exemplary embodiment, application of fluid pressure to the expandable tube is able to cause the backing plate to overcome the springs' biasing force and move radially inward. After the pressure in the tube is reduced then the biasing force of the springs contributes to moving the backing plate in the radially outward direction. Each of the guide cavities is specifically configured for engagement with a respective torque bar, so that the two torque bars are able to engagingly guide the backing plate during its radial movement.

The configuration of an exemplary backing plate permits its usage with different torque bar arrangements in clutch brake elements. For example, a same backing plate can be used with one, two, or more than two (e.g., three) torques bars. The different torque bar arrangements that are now available with the exemplary backing plate allow for the torque bar/backing plate bearing area to be increased, the torque carrying capacity to be increased, and induced stresses to be reduced, all within the same envelope size.

The relationships among exemplary backing plates and torque bars provide for improved clutch brake elements. These and other benefits of example embodiments will be made apparent from the following detailed description.

BRIEF DESCRIPTION OF DRAWINGS

FIG. 12 is a view which shows an end portion of an exemplary torque bar.

DETAILED DESCRIPTION

To provide better understanding, a discussion regarding a clutch brake element embodiment will first be provided before particular exemplary backing plates are separately discussed in greater detail. As can be appreciated from the discussion, the exemplary backing plates provide for improved clutch brake elements.

Figure 1:
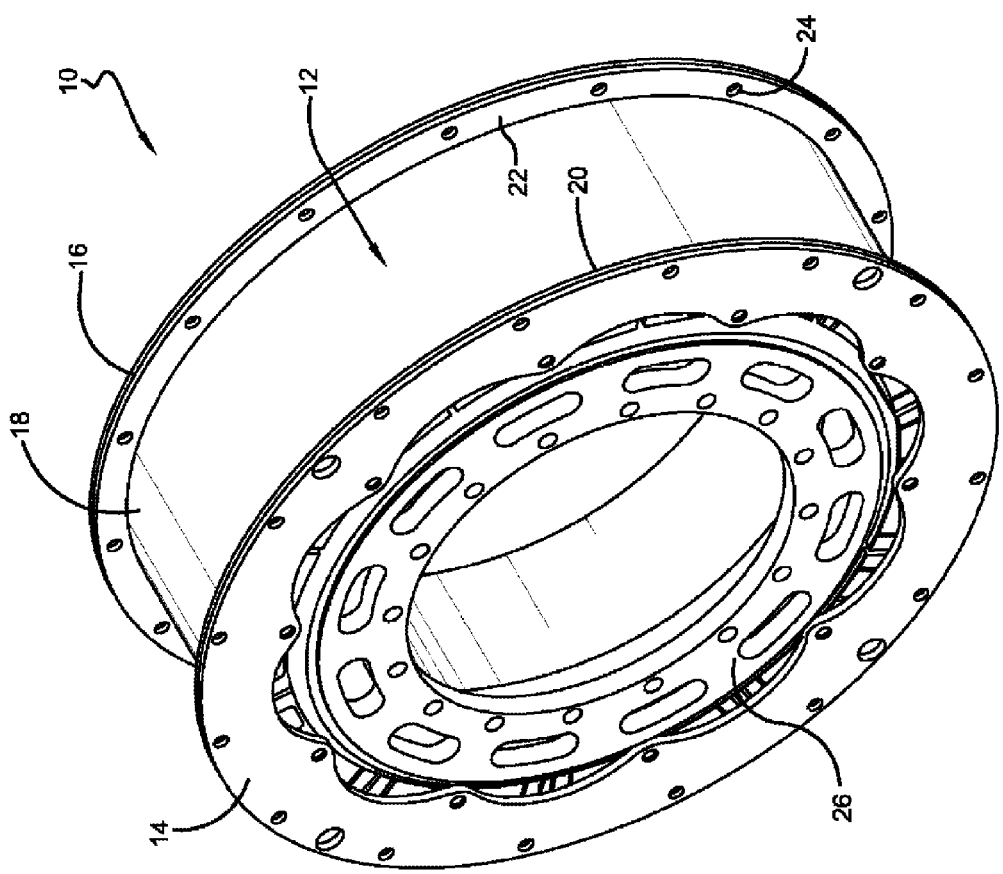
FIG. 1 is an isometric view of an example clutch brake element.

Referring now to the drawings and particularly to FIG. 1, there is shown therein an example of a constricting clutch brake element generally indicated 10. Element 10 has a generally annular body 12. The annular body 12 includes a pair of annular side plates 14 and 16. A rim 18 extends transversely between the side plates. Rim 18 includes flange portions 20, 22 which can be attached to an adjacent side plate by fasteners that extend in holes or openings 24.

The example constricting clutch brake element 10 includes a central rotating member 26. In the example arrangement the central rotating member 26 is rotatably movable relative to the annular body 12 when the clutch brake element is disengaged. When the clutch brake element is engaged, the central rotating member 26 becomes operatively connected with the annular body 12 in a manner later discussed so that neither is rotatably movable relative to the other. As a result, in circumstances where the central rotating member 26 is in operative connection with a driving member and an annular body 12 is in operative connection with a driven member, rotating motion of the driving member can be selectively applied to the driven member by engaging and disengaging the clutch brake mechanism. Similarly where the annular body 12 is in operative connection with the driving member and the central rotating member 26 is in operative connection with the driven member, power from the driving member can be selectively applied to the driven member by engaging and disengaging the clutch brake mechanism.

Likewise in brake applications where it is desired to stop or slow a rotating member, the central rotating member 26 may be operatively connected to the rotating member that it is desired to stop or slow, and the annular body may be connected to a frame or other generally immovable structure that can absorb the force associated with stopping or slowing the rotating member. In such arrangements engaging the clutch brake mechanism stops or slows the rotation of the central rotating member 26 and thus acts as a brake with respect to movement thereof. Similarly the annular body 12 may in operative connection with the rotating member that is desired to be selectively slowed or stopped, and the central rotating member 26 may be in operative connection with a frame or other generally immovable structure. Again in this arrangement, engaging the clutch brake element will cause the rotating member to slow or stop. Of course as can be appreciated, in some arrangements it may be desired to completely stop rotation of the rotating member as rapidly as possible, while in other arrangements it may be desired only to slow the rotating member's speed while rotational motion continues. Selectively engaging and disengaging the clutch brake mechanism of the example embodiment may serve to perform both functions.

Figure 5:
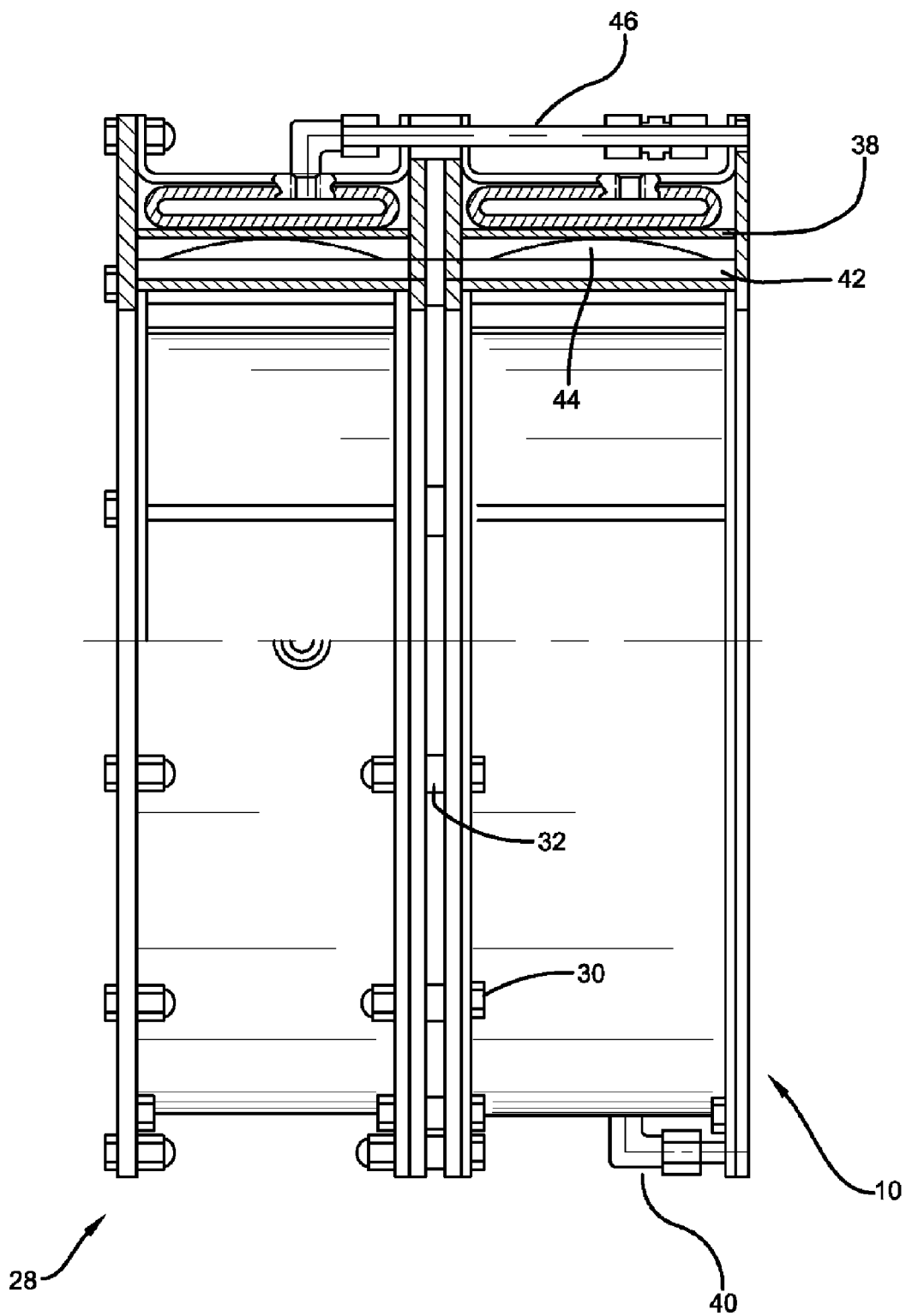
FIG. 5 is a partially sectioned view of a pair of constricting clutch brake elements mounted in tandem.

Numerous different arrangements and configurations may be utilized when operating constricting clutch brake elements of example embodiments to control shafts or other rotating devices and to provide selective power transmission between driving and driven members. For example as shown in FIG. 5, multiple constricting clutch brake elements may be joined together to provide greater power handling capability. For example the arrangement shown in FIG. 5 includes element 10 joined in stacked relation with another similar constricting clutch brake element 28. In this example arrangement the elements are arranged in axially aligned stacked relation through fasteners 30 and spacers 32 that extend between the side walls of the respective elements. Of course this arrangement is exemplary and in other arrangements other configurations may be used.

Figure 2:
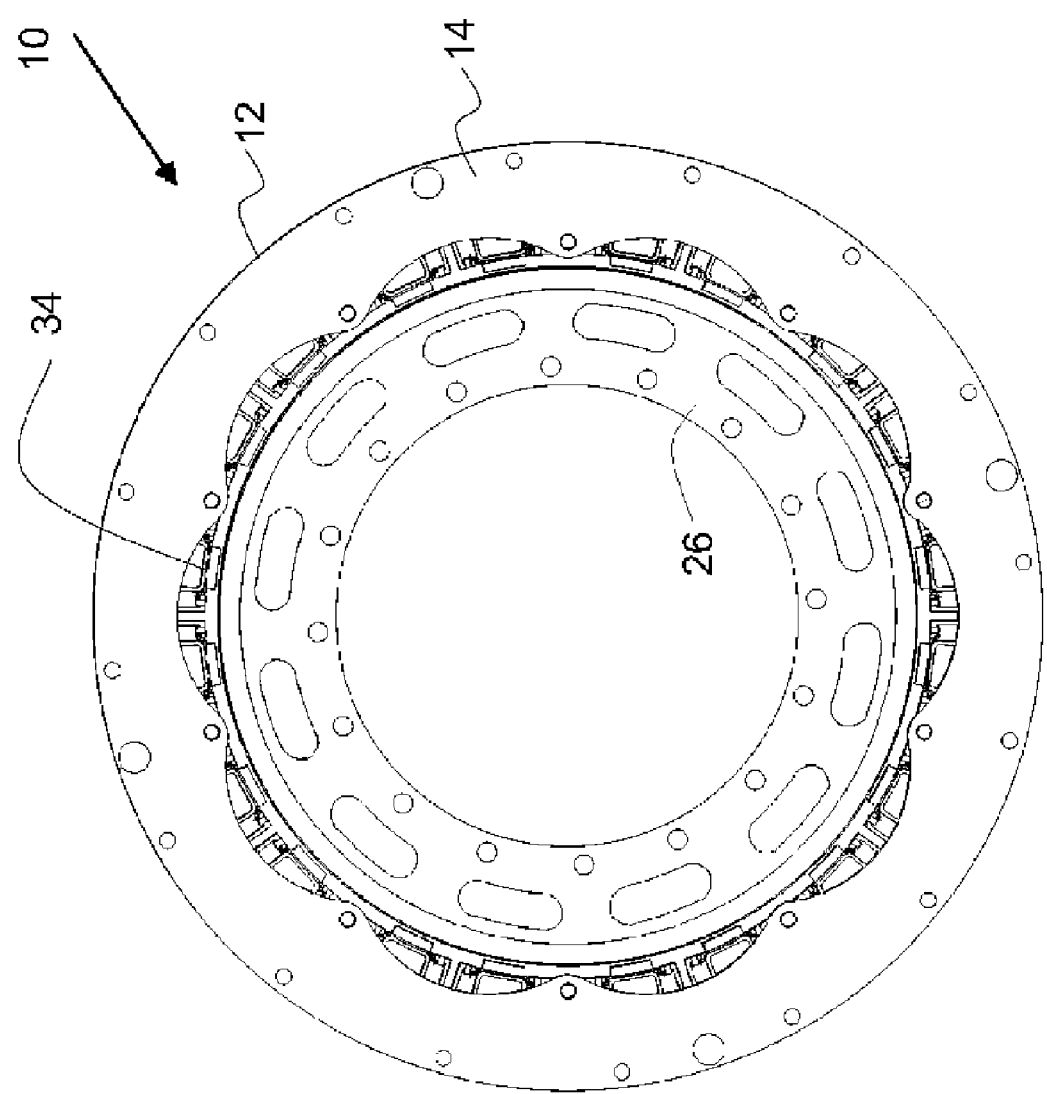
FIG. 2 is a side plan view of the clutch brake element shown in FIG. 1.

The operation of the example constricting clutch brake element is further explained with reference to FIGS. 2 through 4. Operative engagement of the annular body 12 and the rotating member 26 is achieved by movement of a plurality of backing plates 38, which are in operative supported connection with friction linings 34, relative to the annular body 12 of the clutch brake element. In the arrangement the backing plates 38 are movable radially relative to the annular body. The backing plates 38 are able to be moved radially inward so as to cause the friction linings 34 to operatively engage the annular body 12 with the central rotating member 26. In addition, the backing plates 38 are enabled to be selectively moved radially outward so as to cause the friction linings 34 to operatively disengage the annular body 10 and the central rotating member 26.

Figure 3:
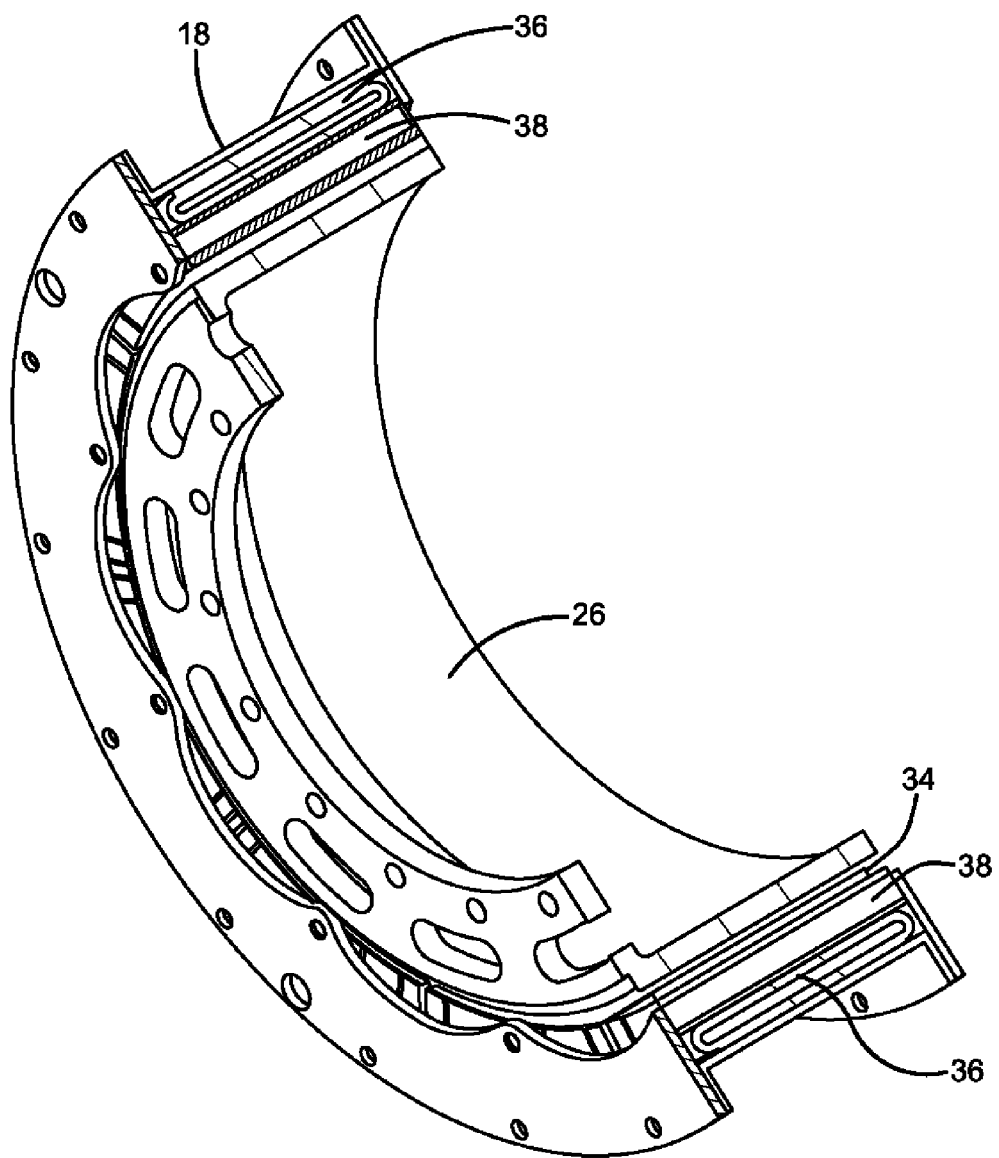
FIG. 3 is a diametric sectional view of the clutch brake element.
Figure 4:
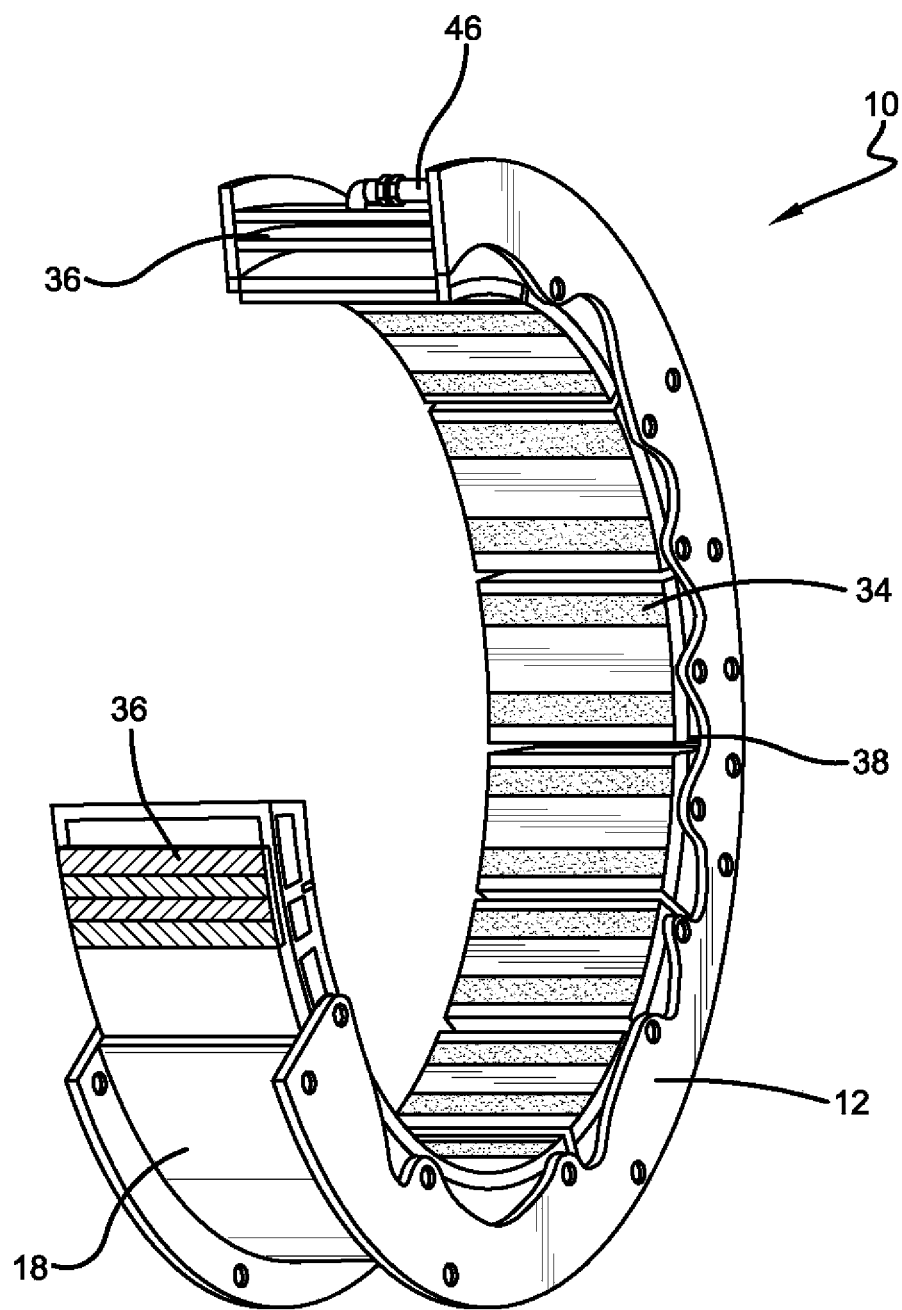
FIG. 4 is an isometric sectional view of a clutch brake element with the central member removed.

As represented in FIGS. 3 and 4 in the example embodiment, movement of the backing plates 38 is achieved by applying and releasing pneumatic pressure in an interior area of a flexible expandable tube 36. The expandable tube 36 is positioned between the rim 18 and a plurality of the backing plates 38. The backing plates 38 are movably mounted in operative supported connection with the annular body 12 in intermediate relation of the side plates 14, 16. The backing plates 38 are in operative supported connection with the friction linings 34.

Figure 6:
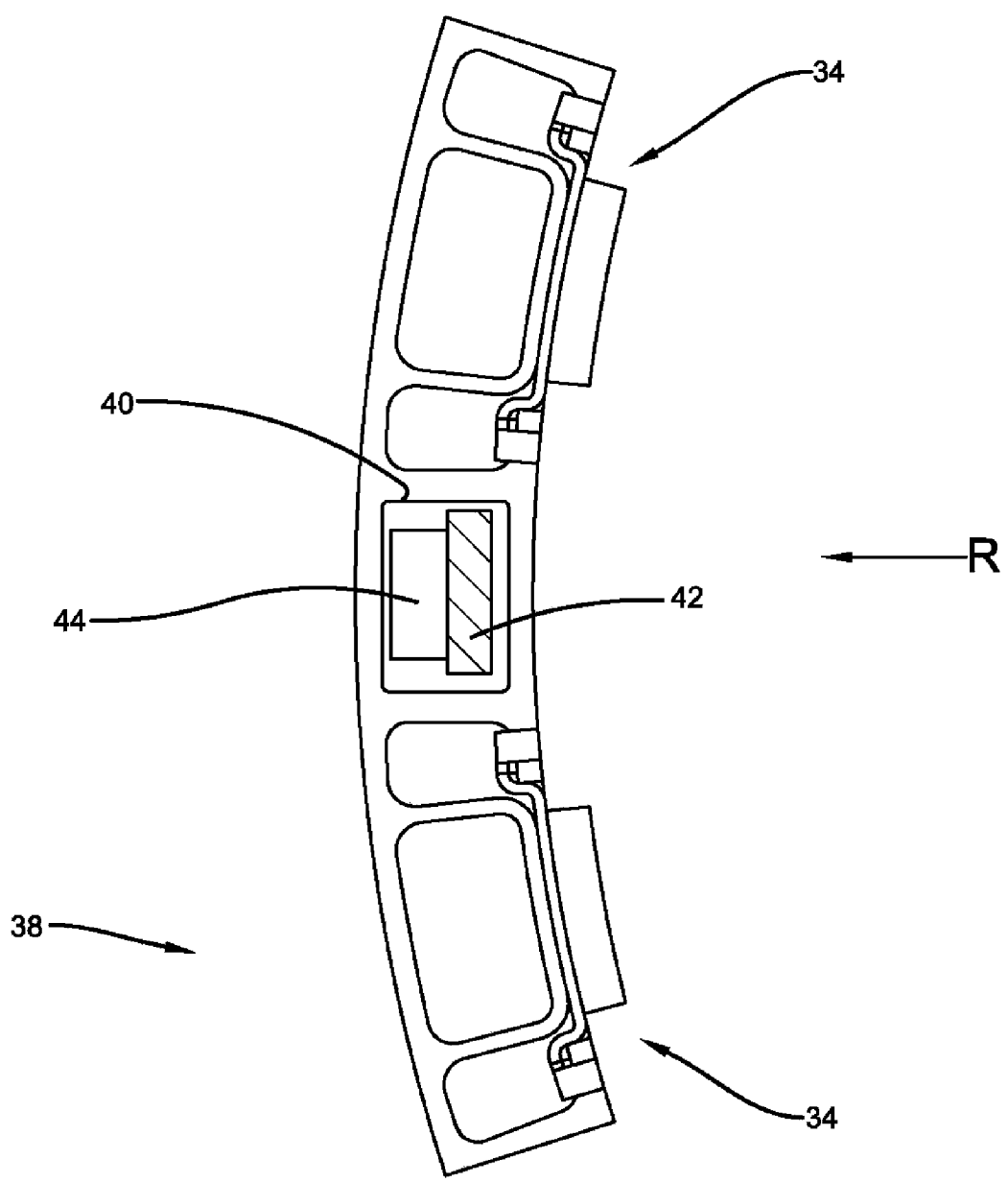
FIG. 6 is a side view of an example backing plate with a torque bar shown in cross section extending in a guide slot of the backing plate.

As shown in FIG. 6, a backing plate 38 includes a cavity 40. A torque bar 42 extends within the cavity 40. The cavity 40 enables the backing plate 38 to move in relation along a radial direction relative to the torque bar 42. In the example arrangement, a spring 44 is positioned in the cavity 40 in operative engagement with the torque bar 42 and an interior face of the cavity. The spring 44 acts to bias the backing plate 38 radially outward in the direction of Arrow R as shown in FIG. 6.

In the example arrangement, when elevated fluid pressure is applied to the expandable tube 36, the tube expands and applies an inward directed force on the backing plates 38. The backing plates which extend annularly about the central rotating member 26, move radially inward overcoming the force of the springs 44. This movement causes the friction linings 34 that are in operative connection with the backing plates 38 to move radially inward as well so that the wear surfaces of the friction pads thereon engage the outer surface of the central rotating member 26. By holding the fluid pressure applied to the expandable tube 36, the annular body 12 of the constricting clutch brake element 10, and the central rotating member 26 remain in fixed operative engagement.

Thereafter, when it is desired to have the central rotating member 26 and the annular body 10 be relatively movable with respect to one another, the elevated pressure is released from the interior of the expandable tube 36. This causes the tube 36 to be reduced in radial size and allows the springs 44 to cause the backing plates 38 to move radially outward.

The friction linings 34 disengage from the central rotating member 26 and/or at least enable relative movement of the annular body 12 and the rotating member 26, until elevated fluid pressure is again applied to the expandable tube 36.

As represented in FIGS. 4 and 5 in the example arrangement, the expandable tube 36 has fluid pressure applied therethrough through one or more fluid conduits 46. The radially inward directed force applied to the backing plates 38 can be controlled through regulating the fluid pressure that is applied to the expandable tube 36. For example, when air pressure is used to expand the tube 36, an increase in the air pressure that is applied will result in a greater constricting force. This results in a greater pressure force acting between a friction lining 34, which is associated with a backing plate 38, and the central rotating member 26. Thus, the result is a firmer engagement between the annular body 10 and the central rotating member 26. Further, flow control valves for controlling the rate of fluid flow to and/or from the expandable tube 36 may be included in the delivery passage that connects to the one or more fluid conduits 46. In this way the rate at which the expandable tube 36 applies and releases its internal pressure, and therefore the rate of change in the force applied to the backing plates 38 can be controlled. Of course it should be understood that in other embodiments other approaches may be used.

In some arrangements the relationship between the backing plates and the friction linings enable the friction linings to be changed without disassembly of the backing plates from the annular body. In addition, in some arrangements the friction linings can be changed while the central rotating member 26 remains in position. This capability to change the friction linings without significant disassembly of the constricting clutch brake element can in many instances reduce machine downtime and enable the machinery in which the element is used, to be more productively used. Of course it should be understood that numerous different approaches that may be utilized when employing the principles described herein.

Figure 7:
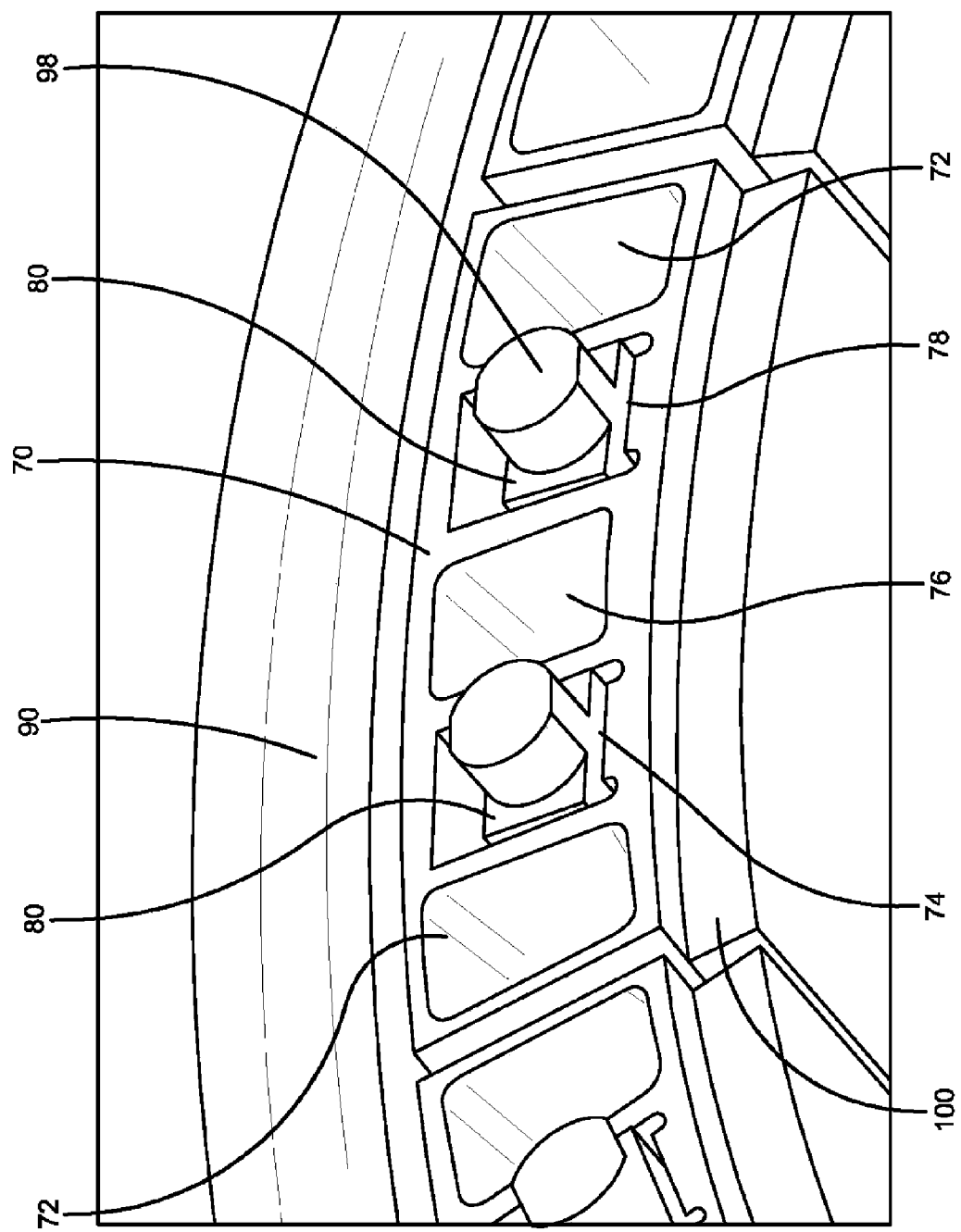
FIG. 7 is an angled view of a portion of an exemplary clutch brake assembly.

FIG. 7 shows a portion of an exemplary clutch brake assembly (or element). Shown are a backing plate 70, torque bars 80, an expandable tube 90, and a friction lining 100. As previously discussed, several backing plates can be circumferentially positioned adjacent each other to form a circular (annular) pattern. As can be seen, the backing plate 70 is located next to two other adjacent backing plates. The friction lining 100 is in operative supported connection with the backing plate 70. Expansion of the tube 90 pushes the backing plate 70 inwardly, which action causes wear surfaces of the friction lining 100 to become frictionally engaged with an adjacent (drive or driven) component.

The element arrangement in FIG. 7 shows the backing plate 70 associated with two torque bars 80, 80. Thus, the arrangement may be referred to herein as being part of a dual torque bar drum element (or assembly). As discussed in more detail later, a same backing plate 70 can also be used with one, two, or more than two torque bars. For example, three torque bars can be used for a triple torque bar drum element (or assembly).

Figure 8:
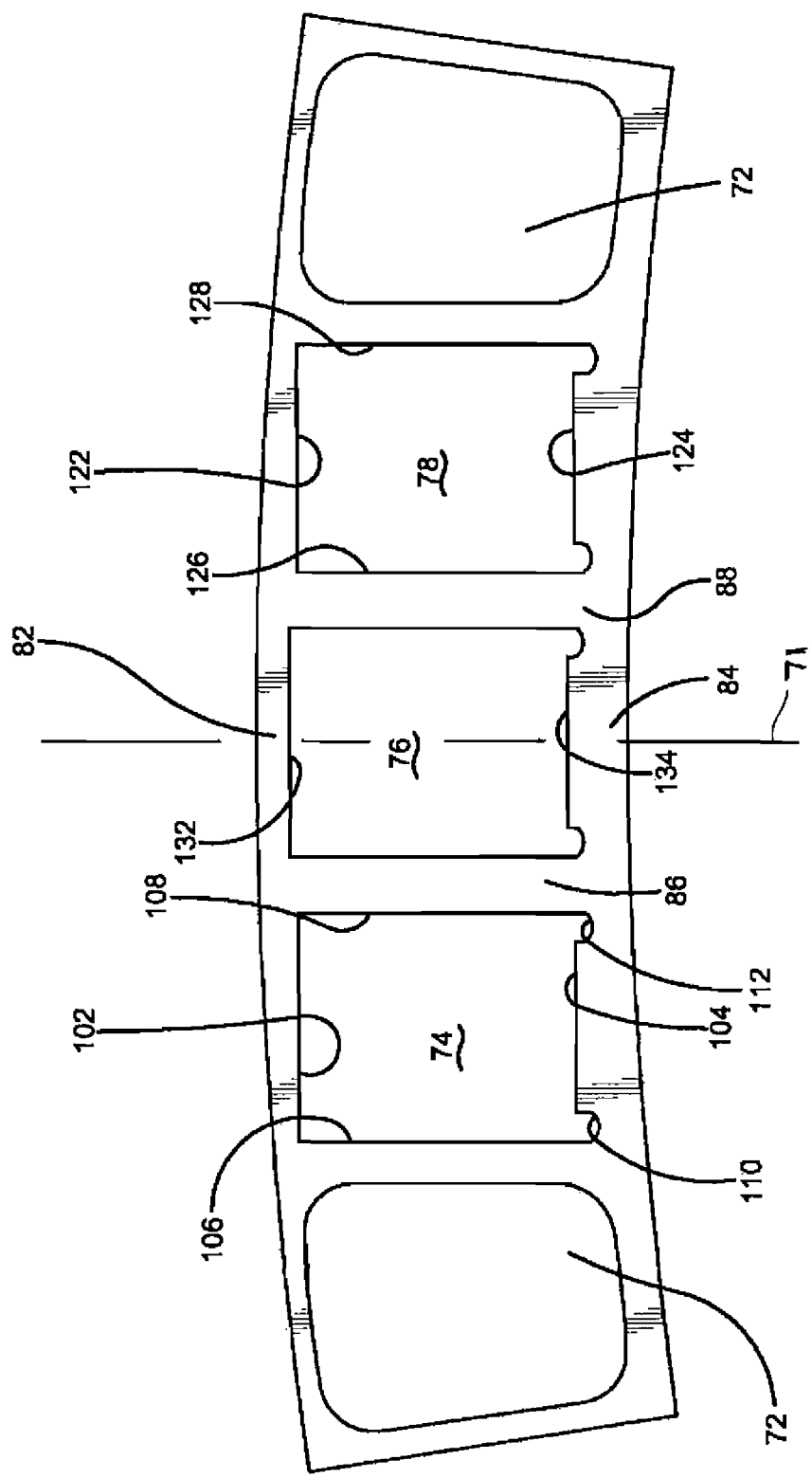
FIG. 8 is a view of an exemplary backing plate.
Figure 9:
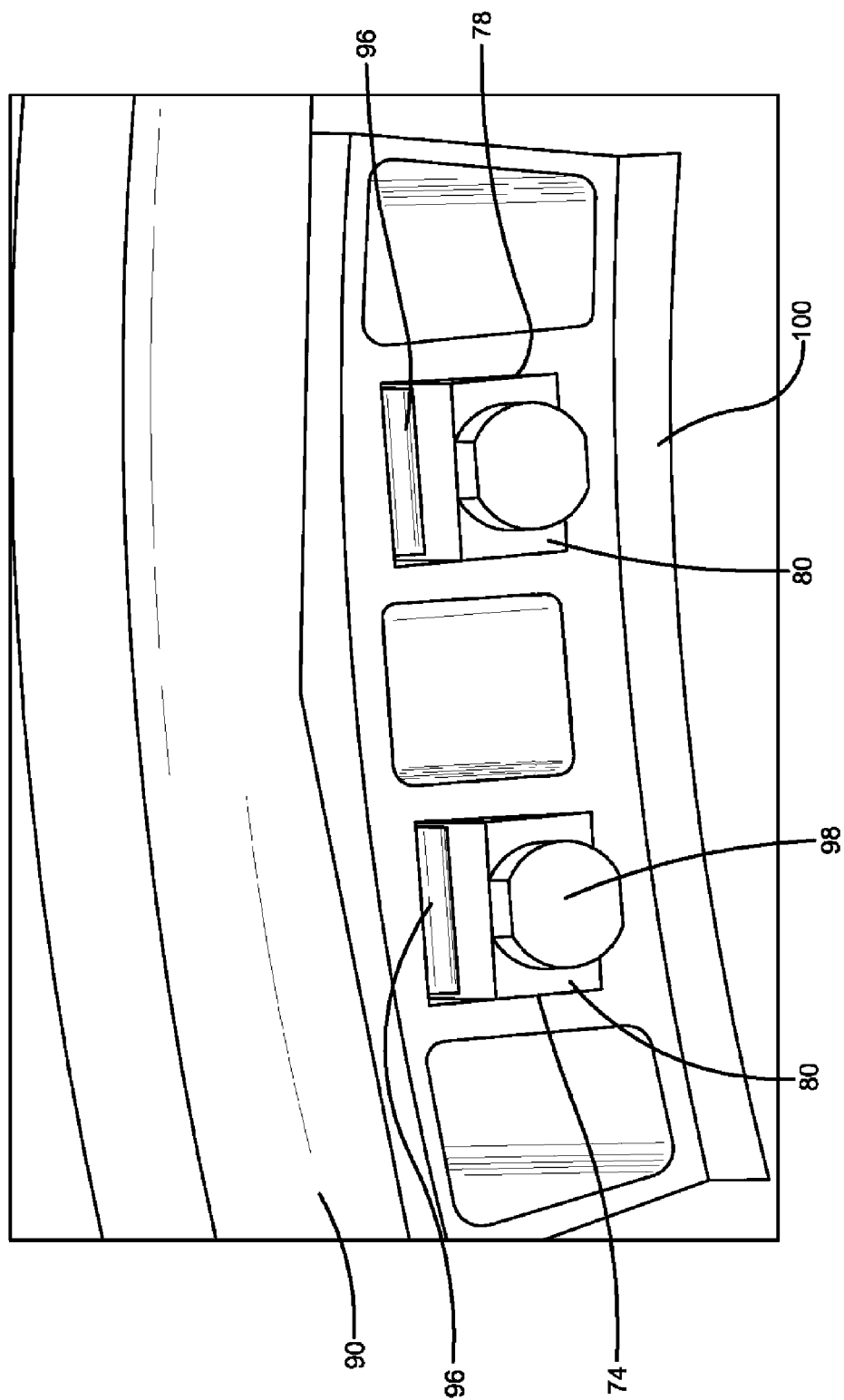
FIG. 9 is a top view of at least part of the assembly shown in FIG. 7.
Figure 10:
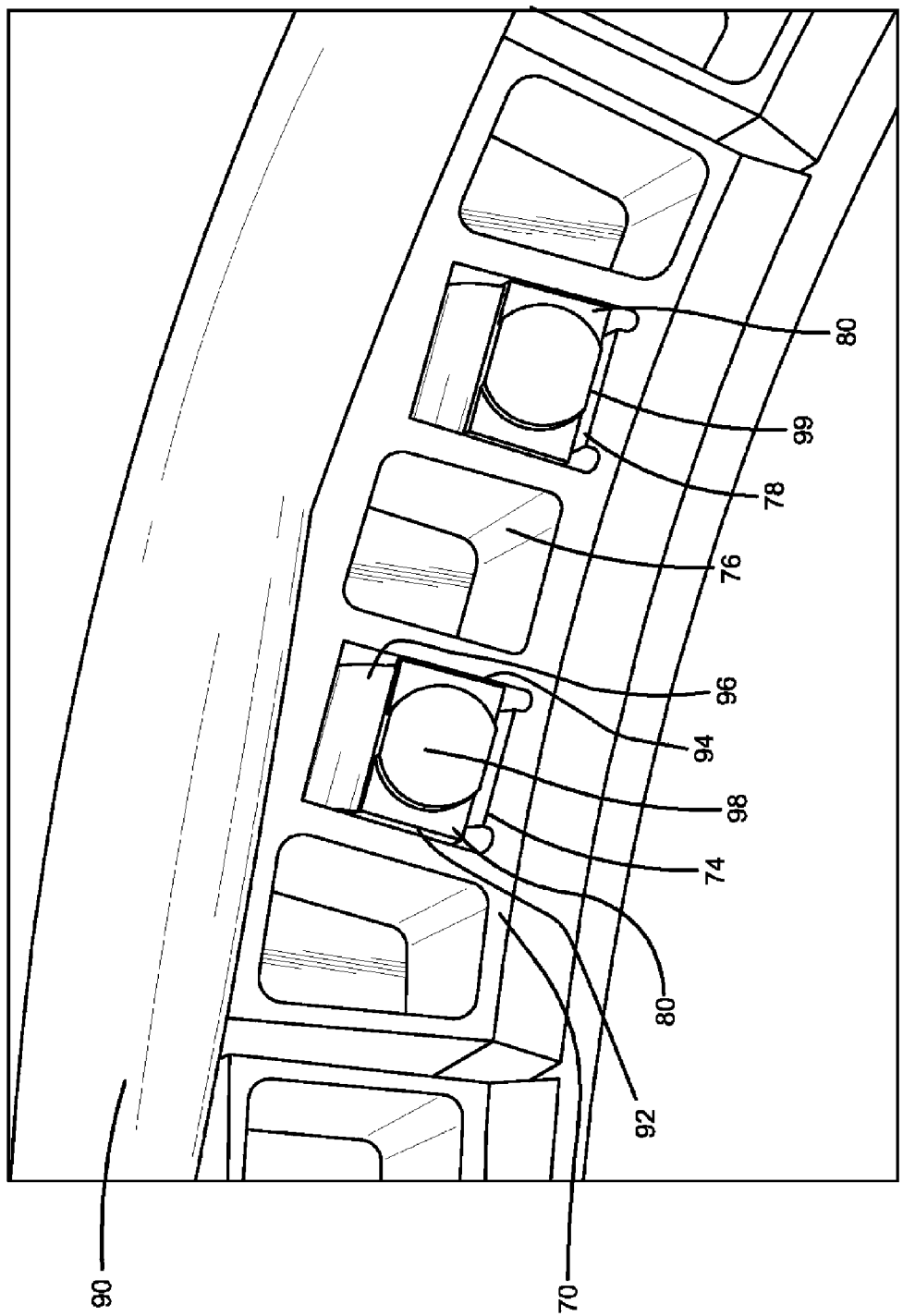
FIG. 10 provides an alternative angled view of a part of the assembly shown in FIG. 7.

FIG. 8 shows a separated view of an exemplary backing plate 70. FIG. 9 shows a top view of at least part of the assembly shown in FIG. 7. FIG. 10 shows an alternative angled view of at least part of the assembly shown in FIG. 7.

In an exemplary embodiment the backing plate 70 has a (arc-shaped) curvature, which extends in a circumferential direction. The backing plate 70 includes several cavities 72. The backing plate 70 in FIG. 8 has five cavities (or openings) 72. However, it should be understood that greater or fewer quantities of cavities can be used in other embodiments.

At least some of the cavities 72 function as a guide cavity. A guide cavity is configured to accept therein in relatively movable relation, at least one torque bar 80. The backing plate 70 in FIG. 8 includes at least three guide cavities 74, 76, 78. In an exemplary dual torque bar drum element arrangement, two torque bars 80, 80 respectively extend in two of the guide cavities 74 and 78. However, in other element embodiments, such as a triple torque bar drum element, another (third) torque bar 80 can extend in the intermediate guide cavity 76. In still in other embodiments only one torque bar can be used. For example, the single torque bar can be used with the center (intermediate or middle) guide cavity 76.

Each of the guide cavities 74, 76, 78 is bound by walls, which include an outer wall 82, an inner wall 84, a first (left) side wall 86, and a second (right) side wall 88. For clarity, only guide cavity 76 is shown with the identified walls 82, 84, 86, 88. For each guide cavity, the outer wall 82 and the inner wall 84 are located parallelly opposite each other. The outer wall 82 is also positioned radially outward further than the inner wall 84. That is, the outer wall 82 and the inner wall 84 are radially spaced from each other. The side walls 86, 88 of each guide cavity are likewise located parallelly opposite each other. The side walls 86, 88 are spaced from each other in a circumferential direction.

In an exemplary embodiment a cavity 72 has a substantially rectangular configuration (area or shape). However, the rectangle can have various types of corners, including straight (perpendicular), curved (e.g., rounded), etc.

In the embodiment shown in FIG. 8, each of the guide cavities 74, 76, 78 has a rectangular configuration which substantially corresponds to (or matches) the rectangular configuration of a torque bar 80. That is, the spacing between a torque bar 80 and the cavity side walls 86, 88 can be a predetermined small distance. Such an arrangement allows the backing plate 70 to radially move in guided engagement against the torque bar 80 in generally radially inward and outward directions. During radial movement of the backing plate 70, one or both of the side walls 86, 88 can be in respective sliding engagement with one or both of the adjacent side edges 92, 94 of the torque bar 80 (FIG. 10). Thus, the torque bar 80 can function as a guide for the backing plate 70. The guide (e.g., torque bar sides) can direct movement of the backing plate 70 in the radial direction. The guide also acts to limit (or reduce) movement (e.g., undesirable play) of the backing plate 70 in the circumferential direction, which is substantially perpendicular to the radial direction.

In the embodiment of FIG. 8, each guide cavity 74, 76, 78 of the backing plate 70 is configured (or sized) to accept therein only one torque bar 80. Both the side walls 86, 88 and a torque bar's side edges 92, 94 have substantially straight inner surfaces to facilitate sliding engagement therebetween. Thus, the predetermined spacing relationship between a guide cavity of the backing plate 70 and a torque bar 80 allows one or more of the cavity's sides 86, 88 to be in sliding engagement against a respective adjacent side edge 92, 94 of a torque bar, during radial movement of the backing plate 70. That is, the torque bar 80 is configured and positioned to allow the backing plate 70 (uninhibited) radial movement. However, if need be (e.g., due to circumferential movement of the backing plate), the torque bar 80, through contact with one or both side walls of the guide cavity, can provide radially directed guidance to the backing plate 70 during its radial movement.

Different guiding situations may occur during radial movement of the backing plate 70. For example, in a first scenario the backing plate may move in a perfect radial direction, without either of a guide cavity's sides engaging the torque bar. In another scenario the backing plate's cavity may slide against only one side of the torque bar. In a further scenario the cavity may alternate between sliding engagement with both sides of the torque bar. In yet an additional scenario a (twisted) backing plate may have a cavity that is simultaneously in sliding engagement with both sides of the torque bar. During a complete radial movement of a backing plate, a guide cavity thereof may undergo a combination of these various guided situations with a torque bar.

A torque bar can be associated with one or more release (return) springs. Each guide cavity of an exemplary backing plate is configured (or sized) to accept therein (at least part of) at least one release spring. A cavity-positioned release spring is operably configured to provide to the exemplary backing plate, a biasing force that is directed radially outward.

Figure 11:
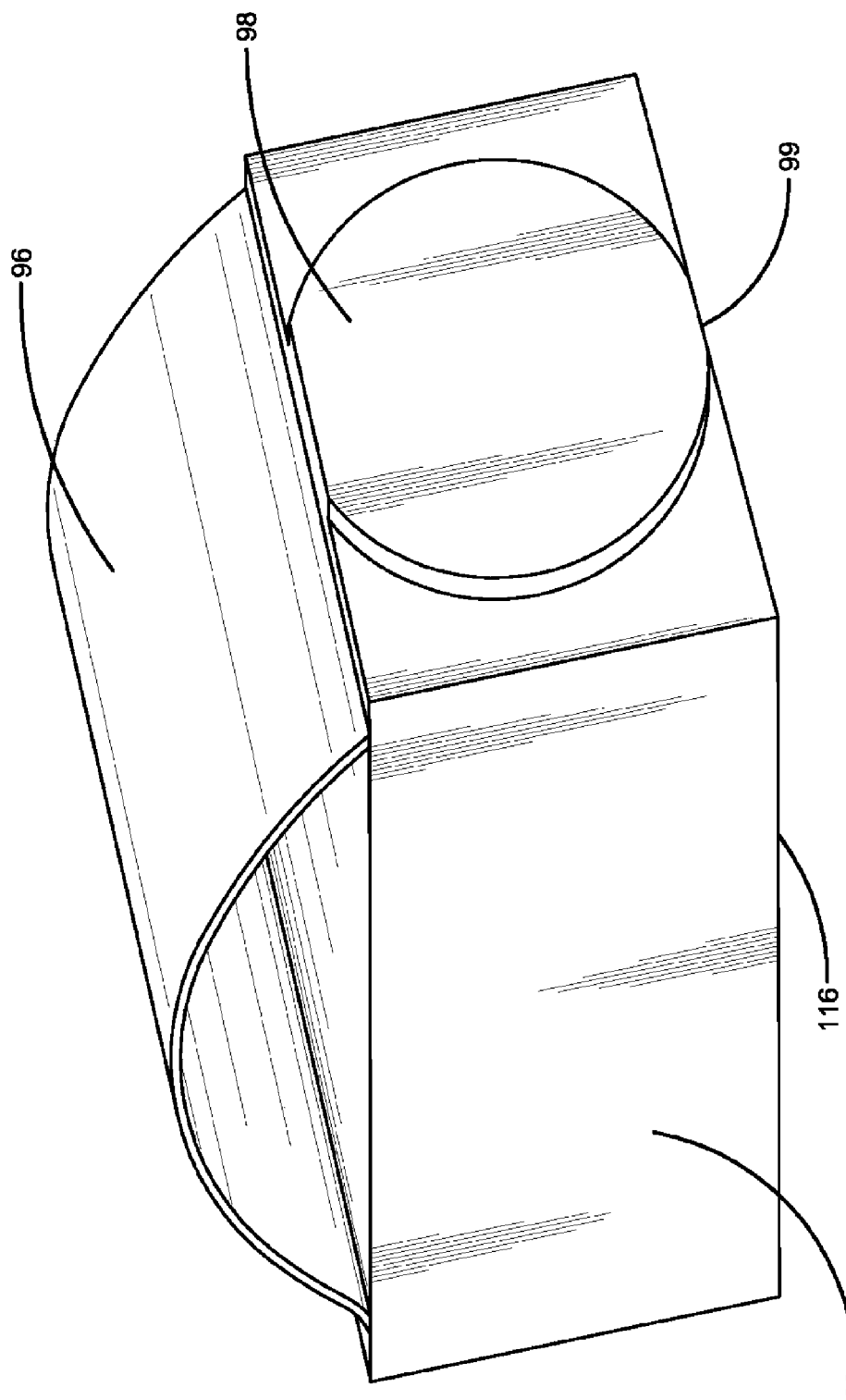
FIG. 11 is a view which shows an exemplary relationship regarding an operative positioning arrangement involving a release spring and an adjacent torque bar.

FIG. 11 shows an example of a release spring 96 that is associated with a torque bar 80. In an exemplary embodiment the spring 96 is a leaf spring. However, in other embodiments other types of springs (or biasing members) can be used. Each end of the spring 96 can be positioned so that the spring is bound (kept) in place between the torque bar and a wall of a guide cavity. The spring can be freely movable while it is operatively positioned, without being attached (or affixed) to any member. In alternative embodiments a release spring may be attached to a torque bar. In still other alternative embodiments a release spring may be attached to a wall of a guide cavity.

FIG. 12 provides a view of an end portion of a torque bar 80. The end portion includes an end piece 98. The end piece is dimensionally configured for engagement with an opening in a side plate 14, 16 (e.g. FIG. 1). The substantially straight portion 99 of the end piece 98 can assist in preventing slippage between the torque bar and the end piece during torque transfer.

A torque bar 80 can be integrally fabricated along with an end piece 98 as a single one-piece unit. That is, the end piece 98 is an integral portion of the one-piece torque bar. In alternative embodiments, a separate end piece may be affixed to a separate torque bar by any of various fastening techniques. For example, the end piece may be threaded, allowing it to be screwed into receiving threads in the torque bar. Other affixing techniques can be welding, etc.

The release spring 96 is configured to extend at least partly in a guide cavity of the backing plate 70. In an exemplary embodiment, a torque bar 80 is positioned so that the release spring 96 imparts its biasing force against the outer wall 82 of the guide cavity. That is, the spring 96 is positioned between the stable torque bar 80 and the movable outer wall 82. In other embodiments the spring 96 may be (oppositely) positioned to engage the cavity's inner wall 84.

Expansion of the expandable tube 90 generates a radial inwardly-directed force that is greater than the radially outward directed force imparted by the plurality of circularly arranged release springs 96 (in the circular grouping of backing plates). Thus, expansion of the tube 90 forces the backing plate 70 inward, while the release springs 96 get compressed. Following release of pressure from the tube 90 these springs 96 are no longer biased to a compressed state. Thus, the springs 96 are then free to push the backing plate 70 outward. As can be appreciated, the outwardly directed biasing force provided by the springs 96 can also assist in releasing (removing) the wear surfaces of the friction linings (which are attached to the backing plates) from their engagement with a drive/driven member.

In an exemplary embodiment, the inner surface of the outer wall 82 in each guide cavity (compartment or pocket) 74, 76, 78 is substantially straight and flat (planar). These outer wall inner surfaces extend in a parallel direction relative to each other. That is, the inner faces of these outer walls 82 in each guide cavity are substantially parallel to each other.

The inner (face) surface of the side walls 86, 88 in each guide cavity are also substantially straight and flat (planar). These side wall inner surfaces are parallel to each other. Thus, unlike the side wall inner surfaces of the center guide cavity 76, the side wall inner surfaces of the guide cavities 74, 78 do not directly extend in a radial direction. The relative parallel arrangements associated with the guide cavities 74, 76, 78 cause the outward acting spring force in the outer guide cavities 74, 78 not to act in alignment with the radial direction. The springs 96 in these cavities are positioned away from the center line 71 of the backing plate 70, (see FIG. 8), and the force thereof enables stable movement of the backing plate radially inward and outward. The side wall inner surfaces are substantially perpendicular to both the outer wall inner surface and an inner wall inner surface. As can be appreciated, this substantially perpendicular guide cavity configuration facilitates movement of the backing plate 70 in engagement with torque bars both radially inward and outward.

In an exemplary embodiment the configuration of the guide cavity 74 is substantially identical to the configuration of the guide cavity 78. In an exemplary embodiment the inside of the guide cavity 74 comprises respective inner surfaces 102, 104, 106, 108 for each of the outer wall 82, the inner wall 84, and the side walls 86, 88.

In the exemplary embodiment of the backing plate in FIG. 8 the inside of the inner wall 84 of the guide cavity 74 comprises a substantially straight (flat) inner surface portion 104. This straight inner surface portion 104 is configured for engagement with the flat inner face 116 (FIG. 11) of the torque bar 80 (e.g., the side of the torque bar that is opposite the release spring side). The inside of the inner wall 84 also comprises radius (curved) configuration portions 110, 112. As can be seen, the straight inner surface portion 104 is located between a first (undercut) curved inner surface portion 110 and a second (undercut) curved inner surface portion 112. That is, the curved inner surface portions 110, 112 are each adjacent a respective cavity side wall 86, 88. Furthermore, the straight inner surface portion 104 is positioned radially outward further than both of the curved inner surface portions 110, 112. Thus, the straight inner surface portion 104 is raised in cross section relative to recessed curved inner surface portions 110, 112. As discussed in more detail later, these curved inner surface portions 110, 112 are strategically configured and positioned to result in lower stress (stress relief) to the backing plate 70 during a torque transfer operation.

Again, the outer 82, inner 84, and side walls 86, 88 for each guide cavity are positioned relative to each other. For the first cavity 74, its outer wall inner surface 102 and its inner wall inner surface 104 extend in substantially parallel directions. The first cavity's side wall inner surfaces 106, 108 also extend in substantially parallel directions. Similarly, for the second cavity 78, its outer wall's inner surface 122 and its inner wall's straight inner surface portion 124 extend in substantially parallel directions. The second cavity's side wall inner surfaces 126, 128 also extend in substantially parallel directions. Likewise, for the intermediate cavity 76, the inner surface 132 of its outer wall 82 and the inner surface 134 of its inner wall 84 extend in substantially parallel directions, and the inner surfaces of its side walls 86, 88 also extend in substantially parallel directions.

In the exemplary backing plate of FIG. 8 the inner wall 84 of the intermediate cavity 76 includes curved surface portions 110, 112. Thus, the inner surface 134 of this cavity 76 is relatively raised in cross section relative to the recessed curved surface portions. However, the inner wall 84 in the intermediate cavity 76 in the backing plate of the exemplary clutch brake element shown in FIGS. 7, 9, and 10, has an inner surface 134 that is substantially straight (without curved surface portions). It should be understood that the exemplary backing plate in FIG. 8 can likewise be used in the clutch brake element embodiments of FIGS. 7, 9, and 10.

As previously discussed, the inner surfaces of the outer walls 82 of each of the first, second, and intermediate cavities extend in substantially parallel directions. Also, the inner surfaces of the inner walls 84 of each of the first, second, and intermediate cavities extend in substantially parallel directions. That is, the outer wall inner surface 102 of the first cavity 74 and the outer wall inner surface 122 of the second cavity 78 extend in substantially parallel directions. In an exemplary embodiment, this inner surface 102 of the outer wall 82 of the first cavity 74 is not only parallel with but it is also substantially aligned with the inner surface 122 of the outer wall 82 of the second cavity 78.

Similarly, the first cavity inner wall inner surface 104 and the second cavity inner wall inner surface 124 extend in substantially parallel directions. In the exemplary embodiment, this (raised) inner surface 104 of the inner wall 84 of the first cavity 74 is also substantially aligned with the (raised) inner surface 124 of the inner wall 84 of the second cavity 78. Also, the inner surfaces 106, 108 of the side walls of the first cavity 74 and the inner surfaces 126, 128 of the side walls of the second cavity 78 extend in substantially parallel directions.

As can be seen in FIG. 8, the inner portion of the outer walls 82 of each of the first, second, and intermediate rectangular-configured cavities 74, 76, 78 are substantially parallel with each other. The inner (raised) portion of the inner walls 84 of each of these first, second, and intermediate cavities are also substantially parallel with each other (and also substantially parallel with the inner portion of their outer walls). The inner portions of the side walls 86, 88 of each of the first, second, and intermediate cavities are substantially parallel with each other (and substantially perpendicular with the inner portion of their outer walls 82 and inner walls 84). Furthermore, in an exemplary embodiment regarding the positional relationship of the first cavity 74 and the second cavity 78, the respective inner surfaces 102, 122 of their outer walls are substantially aligned with each other, and the inner surfaces 104, 124 of their inner walls are also substantially aligned with each other.

The center guide cavity 76 is positioned radially outward further than the other adjacent guide cavities 74, 78. Thus, the inner surface 132 of the outer wall in the middle guide cavity 76 is positioned further radially outward compared to the inner surfaces 102, 122 of the outer walls in the outer guide cavities 74, 78. Also, the inner (raised) surface 134 of the inner wall in the middle guide cavity 76 is positioned further radially outward compared to the inner surfaces 104, 124 of the inner walls in the directly adjacent guide cavities 74, 78.

Again, as can be seen in FIG. 8, the exemplary backing plate 70 provides many improved features and relationships. For example, the flat inner surfaces of the side walls 106, 108 of the guide cavities 74, 78 extend substantially parallel with each other. Further, these inner surfaces of the side walls 106, 108 are substantially perpendicular to the raised inner surfaces of the inner walls 84 of cavities 74, 78. Also, the inner surface 104 of the inner wall 84 of the guide cavity 74 and the inner surface 124 of the inner wall 84 of the guide cavity 78 do not directly extend in a direction that is perpendicular to the radial direction. Rather, in an exemplary embodiment of cavity 74, the inner wall 84 that includes one (left) section of the raised inner surface 104 is thicker than the other (right) section of the inner surface 104. Similarly for cavity 78, a (right) section of the raised inner surface 124 is thicker than the other (left) section of the inner surface 124. This parallel/perpendicular inner surfaces arrangement causes the outward acting spring force in these outer guide cavities 74, 78 to act in a direction that moves the backing plate radially, but not act directly in the radial direction. Rather, both springs (in cavities 74, 78) can provide a balanced retraction force in the generally same outward direction. This outward direction would also be the same biasing direction provided by a spring in the center cavity 76. As can be appreciated, because of the exemplary arrangement there is virtually no sideways component to the biasing forces provided by the springs in the cavities 74, 78. Such a sideways force would be an unwanted force. Further, such a sideways force could cause more frictional resistance to the relative movement between the cavity wall(s) and its respective torque bar.

Another feature is that the flat inner surfaces in the exemplary cavities 74, 78 reduce the risk of binding (catching) between the torque bar and a cavity wall. Such binding could prevent the backing plate from being fully retracted outwardly and/or could inhibit movement. The features of the rounded (cutout) portions 110, 112 of the inner wall 84 in each cavity 74, 78 also provide straight inner surfaces (of the side walls 86, 88) for the torque bar to act against throughout its entire length of travel inside the cavity. These rounded wall configurations 110, 112 additionally provide stress relief in comparison to a sharper corner. Thus, the exemplary configuration including cutouts 110, 112 also enables the backing plate to transmit a higher force with lower risk of stress cracking.

Another feature of the exemplary arrangement is that the guide cavity 76 is positioned further outward relative to the other guide cavities 74, 78. As previously noted, in some embodiments only one torque bar need be used, and the center cavity 76 can be used to house this single torque bar. Thus, because the guide cavity 76 is positioned further radially outward in the exemplary backing plate 70, when only one torque bar 80 is used the center (sole) spring 96 is compressed more for a given radially inward movement of the backing plate 70 (and there is also more outward retraction force) compared to each individual spring in a two torque bar set up (using only the cavities 74, 78). As can be appreciated, with a dual torque bar arrangement, the two springs 96 (combined) provide a greater retraction (return) force, even though neither of these two springs is compressed as much as the single spring would be compressed in the single torque bar set up arrangement.

As can be further appreciated, these advantageous features and relationships are produced by features of the exemplary backing plate 70. Furthermore, the exemplary backing plate 70 provides advantageous features and characteristics for exemplary clutch brake elements.

The exemplary two torque bar arrangement (e.g., via cavities 74, 78) in a dual torque bar backing plate element, allows for a doubling of the load bearing area (i.e., the contact area between torque bars and backing plate). This enlarged load bearing area can result in induced stresses being reduced by approximately 43%. Use of the dual torque bar arrangement also enables torque capacity to be increased by approximately 50%. The exemplary dual torque bar backing plate element embodiment allows torque carrying capacity to be increased by approximately 1.5× within the same envelope size.

The configuration of the exemplary backing plate also allows in some arrangements, for simultaneous usage of three torque bars, which will even further increase torque carrying capacity. Thus, the exemplary embodiment provides a flexible arrangement that can be easily modified to change torque capacity based on torque bar quantity. As can be appreciated, the exemplary backing plate allows for interchangeability of parts to meet requirements for various torque capacities. The useful abilities discussed herein allow for enhanced torque transmission applications, especially in the areas of mineral processing, marine propulsion, metal forming machinery, oil field machinery, paper processing, rubber processing, etc.

In review, an exemplary embodiment provides for dual torque bar backing plate elements comprising drum element assemblies where two torque bars that are in supporting connection with each backing plate. The exemplary dual torque bar drum element arrangement is a pneumatically engaged constricting drum style element which allows for transfer of higher torque. The exemplary element can be assembled with the torque bar pair positioned between two side plates. A flexible air tube is positioned to surround (radially outside of) the circumferentially extending group of backing plates. Pressurized air is applied to expand the air tube, which then causes radially inward movement of the backing plate toward a drum. Friction linings attached to the backing plates engage to cause frictional coupling. The friction coupling can generate torque that can be transferred from one shaft to another shaft through a rim (connected to a spider) and the drum (connected to driven hub). The exemplary embodiments enable the torque bar/backing plate engagement area to be twice as large (in comparison to usage of only a single torque bar), and induced stresses to be reduced by approximately 43%. Exemplary embodiments can assist in increasing torque carrying capacity by 1.5 times, all within the same envelope size. Furthermore, the exemplary arrangement additionally allows for the same backing plate assembly to be used with a single torque bar (e.g., via use of the center cavity). Also, the same backing plate assembly can accommodate two or even three torque bars at once, to meet a need for even more torque carrying capacity.

In the foregoing description certain terms have been used to describe example arrangements and for purposes of brevity, clarity and understanding. However, no unnecessary limitations are to be implied therefrom because such terms have been used for descriptive purposes and are intended to be broadly construed. Moreover, the descriptions and illustrations herein are by way of examples and the inventive teachings are not limited to the specific features shown and described.

It will be readily understood that the features of exemplary embodiments, as generally described and illustrated in the Figures herein, can be arranged and designed in a wide variety of different configurations. That is, the features, structures, and/or characteristics of embodiments or arrangements described herein may be combined in any suitable manner in one or more other embodiments or arrangements. Thus, the detailed description of the exemplary embodiments of apparatus and method, as represented in the attached Figures, is not intended to limit the scope of the invention as claimed, but is merely representative of selected exemplary embodiments that implement the principles described herein.

In the foregoing description of exemplary embodiments, certain terms like "left", "right", "outer", "inner", "front", "rear", "top", and "bottom" may have been used. However, it should be understood that these terms are used descriptively of the figures, and do not represent limitations on the scope of the exemplary embodiments, as defined by the claims hereof.

Further in the following claims any feature described as a means for performing a function shall be construed as encompassing any means known to those skilled in the art as being capable of carrying out the recited function and shall not be deemed limited to the particular means shown or described for performing the recited function in the foregoing description, or mere equivalents thereof.

Having described the features, discoveries and principles of the exemplary embodiments, the manner in which they are constructed and operated and the advantages and useful results attained; the new and useful structures, devices, elements, arrangements, parts, combinations, systems, equipment, operations, methods, processes, and relationships are set forth in the appended claims.

I claim:

1. An apparatus comprising:
a clutch brake assembly,
wherein the clutch brake assembly includes a generally annular body,
wherein the body includes a pair of annular side plates and an annular rim intermediate of the side plates,
wherein the body includes a central axis,
wherein the clutch brake assembly includes a plurality of torque bars,
wherein each torque bar extends in an axial direction,
wherein each torque bar is in operative supported connection with each of the side plates,
wherein the plurality of torque bars includes a first torque bar and a second torque bar,
wherein the clutch brake assembly includes a plurality of release springs,
wherein the plurality of release springs includes a first release spring and a second release spring,
wherein the clutch brake assembly includes a plurality of backing plates,
wherein each backing plate is movably mounted in operative supported connection with the body,
wherein each backing plate is radially movable relative to the central axis,
wherein the plurality of backing plates include a first backing plate,
wherein the first backing plate includes at least two cavities,
wherein in cross section each cavity is bounded by an outer wall, an inner wall, a first side wall, and a second side wall, wherein the at least two cavities include a first cavity,
wherein the first cavity is bounded by a first cavity outer wall, a first cavity inner wall, a first cavity first side wall, and a first cavity second side wall, wherein the first cavity outer wall is positioned radially outward further than the first cavity inner wall,
wherein the first cavity outer wall comprises a first cavity outer wall inner surface,
wherein the first cavity inner wall comprises a first cavity inner wall inner surface,
wherein the first cavity inner wall inner surface and the first cavity outer wall inner surface extend in substantially parallel directions,
wherein the first cavity inner wall includes a first curved surface adjacent the first cavity first side wall,
wherein the first cavity inner wall includes a second curved surface adjacent the first cavity second side wall,
wherein the first cavity inner wall inner surface is located between the first curved surface and the second curved surface of the first cavity inner wall,
wherein the first cavity inner wall inner surface is positioned radially outward further than both the first curved surface and the second curved surface of the first cavity inner wall,
wherein the first cavity first side wall comprises a first cavity first side wall inner surface,
wherein the first cavity second side wall comprises a first cavity second side wall inner surface,
wherein the first cavity first side wall inner surface and the first cavity second side wall inner surface extend in substantially parallel directions,
wherein the first torque bar extends through the first cavity,
wherein the first torque bar is configured to engagingly guide at least one of the first cavity first side wall and the first cavity second side wall during radial movement of the first backing plate,
wherein the first torque bar is configured to engage at least one of the first cavity first side wall and the first cavity second side wall during transfer of torque responsive to a turning force,
wherein the first release spring is positioned at least partly in the first cavity between the first torque bar and the first cavity outer wall,
wherein the first release spring is configured to bias the first backing plate toward radial movement in an outward direction,
wherein the at least two cavities include a second cavity, wherein the second cavity is bounded by a second cavity outer wall, a second cavity inner wall, a second cavity first side wall, and a second cavity second side wall,
wherein the second cavity outer wall is positioned radially outward further than the second cavity inner wall,
wherein the second cavity outer wall comprises a second cavity outer wall inner surface,
wherein the second cavity outer wall inner surface and the first cavity outer wall inner surface extend in substantially parallel directions,
wherein the second cavity outer wall inner surface and the first cavity outer wall inner surface extend in substantially aligned directions,
wherein the second cavity inner wall comprises a second cavity inner wall inner surface,
wherein the second cavity inner wall inner surface and the second cavity outer wall inner surface extend in substantially parallel directions,
wherein the second cavity inner wall inner surface and the first cavity inner wall inner surface extend in substantially parallel directions,
wherein the second cavity inner wall inner surface and the first cavity inner wall inner surface extend in substantially aligned directions,
wherein the second cavity inner wall includes a first curved surface adjacent the second cavity first side wall,
wherein the second cavity inner wall includes a second curved surface adjacent the second cavity second side wall,
wherein the second cavity inner wall inner surface is located between the first curved surface and the second curved surface of the second cavity inner wall,
wherein the second cavity inner wall inner surface is positioned radially outward further than both the first curved surface and the second curved surface of the second cavity inner wall,
wherein the second cavity first side wall comprises a second cavity first side wall inner surface,
wherein the second cavity second side wall comprises a second cavity second side wall inner surface,
wherein the second cavity first side wall inner surface and the second cavity second side wall inner surface extend in substantially parallel directions,
wherein the second cavity first side wall inner surface and the first cavity first side wall inner surface extend in substantially parallel directions,
wherein the second torque bar extends through the second cavity,
wherein the second torque bar is configured to engagingly guide at least one of the second cavity first side wall and the second cavity second side wall during radial movement of the first backing plate,
wherein the second torque bar is configured to engage at least one of the second cavity first side wall and the second cavity second side wall during transfer of torque responsive to the turning force,
wherein the second release spring is positioned at least partly in the second cavity between the second torque bar and the second cavity outer wall,
wherein the second release spring is configured to bias the first backing plate toward radial movement in the outward direction,
wherein the clutch brake assembly includes an expandable tube, wherein the expandable tube is positioned radially outward relative to the first backing plate,
wherein the expandable tube is radially expandable responsive to application of fluid pressure,
wherein expansion of the expandable tube is operative to overcome the bias of the first release spring and the bias of the second release spring to cause the first backing plate to be radially moved in an inward direction,
wherein the inward direction is opposite the outward direction,
wherein the expandable tube is radially retractable responsive to removal of the fluid pressure,
wherein retraction of the expandable tube allows the first release spring and the second release spring to biasing contribute toward radial movement of the first backing plate in the outward direction.

2. The apparatus according to claim 1
wherein the at least two cavities include a third cavity,
wherein the third cavity is positioned between the first cavity and the second cavity.

3. The apparatus according to claim 2
wherein in cross section the third cavity is bounded by a third cavity outer wall and a third cavity inner wall,
wherein the third cavity outer wall comprises a third cavity outer wall inner surface,
wherein the third cavity inner wall comprises a third cavity inner wall inner surface,
wherein the third cavity inner wall inner surface and the third cavity outer wall inner surface extend in substantially parallel directions,
wherein the third cavity is bound by the first cavity second side wall and the second cavity first side wall.

4. The apparatus according to claim 1 and further comprising a frictionlining,
wherein the friction lining includes at least one friction pad,
wherein the friction lining is positioned radially inward relative to the first backing plate.

5. The apparatus according to claim 4
wherein the friction lining is operatively attached to the first backing plate.

6. An apparatus comprising:
an arc shaped backing plate, a first torque bar, a second torque bar, a third torque bar, a first return spring, a second return spring, and a third return spring,
configured for operation in a clutch brake assembly,
wherein the clutch brake assembly comprises a pair of annular side plates, a plurality of backing plates including the backing plate arranged in a circular pattern, a plurality of torque bars including the first torque bar, the second torque bar and the third torque bar arranged in a circular pattern, each torque bar extending axially between and in fixed operative supported connection with each of the side plates, and an expandable tube operative to expand and cause the backing plate in the assembly to be moved in a radially inward direction relative to the axially extending torque bars,
wherein the backing plate includes a plurality of open cavities,
wherein the plurality of open cavities include a first cavity and a second cavity separate from the first cavity, and an intermediate cavity located between and separate from the first and second cavities,
wherein the first cavity, the second cavity and the intermediate cavity extend axially through the backing plate and in axially perpendicular cross section the first cavity and the second cavity are disposed on opposed sides of a radially extending center line of the backing plate and the intermediate cavity is located in centered relation relative to the center line,
wherein in axially perpendicular cross section each of the first cavity, the second cavity and the intermediate cavity is bounded by respective inner surfaces of each of an outer wall, an inner wall, and opposite side walls,
wherein each outer wall is positioned radially outward relative to each inner wall,
wherein the inner surfaces of the side walls of the first cavity, the inner surfaces of the side walls of the second cavity and the inner surfaces of the side walls of the intermediate cavity extend parallel to each other and to the radially extending center line,
wherein the inner surface of the outer wall of the first cavity is in planar alignment with the inner surface of the outer wall of the second cavity, and the inner surface of the outer wall of the intermediate cavity is positioned radially outward relative to the inner surface of the outer wall of the first cavity and the inner surface of the outer wall of the second cavity,
wherein the first cavity, the second cavity and the intermediate cavity respectively simultaneously receive therein, the first torque bar and the first return spring, the second torque bar and the second return spring, and the third torque bar and the third return spring, wherein the first, second and third torque bars and the first, second and third return springs each extend in the axial direction in the respective first, second and intermediate cavities, and the first return spring biases the backing plate radially outward by operative engagement with the inner surface of the outer wall of the first cavity and the first torque bar, the second return spring biases the backing plate radially outward by operative engagement with the inner surface of the outer wall of the second cavity and the second torque bar, and the third return spring biases the backing plate radially outward by operative engagement of the inner surface of the outer wall of the intermediate cavity and the third torque bar,
wherein at least one inner surface of the side walls of the first cavity is configured to move in guided sliding engagement with the first torque bar in the first cavity, at least one inner surface of the side walls of the second cavity is configured to move in guided sliding engagement with the second torque bar in the second cavity, and at least one inner surface of the side walls of the intermediate cavity is configured to move in guided sliding engagement with the third torque bar,
wherein each of the first torque bar, the second torque bar and the third torque bar is disposed away from each of the other torque bars, and
wherein the backing plate is configured to move in guided simultaneous sliding engagement with the first, second and third torque bars along the center line radially at least one of inward and outward.

7. An apparatus comprising:
an arc shaped backing plate, a first torque bar, a second torque bar, a third torque bar, a first return spring, a second return spring, and a third return spring,
configured for operation in a clutch brake assembly, wherein the clutch brake assembly comprises a pair of annular side plates, a plurality of backing plates including the backing plate arranged in a circular pattern, a plurality of torque bars including the first torque bar, the second torque bar and the third torque bar arranged in a circular pattern, each torque bar extending axially between and in fixed operative supported connection with each of the side plates, and an expandable tube operative to expand and cause the backing plate in the assembly to be moved in a radially inward direction relative to the axially extending torque bars,
wherein the backing plate includes a plurality of open cavities,
wherein the plurality of open cavities include a first cavity and a second cavity separate from the first cavity, and an intermediate cavity located between and separate from the first and second cavities, wherein the first cavity, the second cavity and the intermediate cavity extend axially through the backing plate and in axially perpendicular cross section the first cavity and the second cavity are disposed on opposed sides of a radially extending center line of the backing plate and the intermediate cavity is located in centered relation relative to the center line,
wherein in axially perpendicular cross section each of the first cavity, the second cavity and the intermediate cavity is bounded by respective inner surfaces of each of an outer wall, an inner wall, and opposite side walls,
wherein each outer wall is positioned radially outward relative to each inner wall,
wherein the inner surfaces of the side walls of the first cavity, the inner surfaces of the side walls of the second cavity and the inner surfaces of the side walls of the intermediate cavity extend parallel to each other and to the radially extending center line,
wherein the inner surface of the outer wall of the first cavity is in planar alignment with the inner surface of the outer wall of the second cavity,
wherein the inner surface of the inner wall of the first cavity is in planar alignment with the inner surface of the inner wall of the second cavity, and the inner surface of the intermediate cavity is positioned radially outward relative to inner surface of the inner wall of each of the first cavity and the second cavity,
wherein the first cavity, the second cavity and the intermediate cavity respectively simultaneously receive therein, the first torque bar and the first return spring, the second torque bar and the second return spring, and the third torque bar and the third return spring, wherein the first, second and third torque bars and the first, second and third return springs each extend in the axial direction in the respective first, second and intermediate cavities, and the first return spring biases the backing plate radially outward by operative engagement with the inner surface of the outer wall of the first cavity and the first torque bar, the second return spring biases the backing plate radially outward by operative engagement with the inner surface of the outer wall of the second cavity and the second torque bar, and the third return spring biases the backing plate radially outward by operative engagement of the inner surface of the outer wall of the intermediate cavity and the third torque bar,
wherein at least one inner surface of the side walls of the first cavity is configured to move in guided sliding engagement with the first torque bar in the first cavity, at least one inner surface of the side walls of the second cavity is configured to move in guided sliding engagement with the second torque bar in the second cavity, and at least one inner surface of the side walls of the intermediate cavity is configured to move in guided sliding engagement with the third torque bar,
wherein each of the first torque bar, the second torque bar and the third torque bar is disposed away each of the other torque bars, and
wherein the backing plate is configured to move in guided simultaneous sliding engagement with the first, second and third torque bars along the center line radially at least one of inward and outward.

8. An apparatus comprising:
an arc shaped backing plate, a first torque bar, a second torque bar and a third torque bar, a first return spring, a second return spring and a third return spring,
configured for operation in a clutch brake assembly, wherein the clutch brake assembly comprises a pair of annular side plates, a plurality of backing plates including the backing plate arranged in a circular pattern, a plurality of torque bars including the first torque bar, the second torque bar and the third torque bar arranged in a circular pattern, each torque bar extending axially between and in fixed operative supported connection with each of the side plates, and an expandable tube operative to expand and cause the backing plate in the assembly to be moved in a radially inward direction relative to the axially extending torque bars,
wherein the backing plate includes a plurality of open cavities,
wherein the plurality of open cavities include a first cavity and a second cavity separate from the first cavity, wherein the first cavity and the second cavity extend axially through the backing plate and in axially perpendicular cross section the first cavity and the second cavity are disposed on opposed sides of a radially extending center line of the backing plate,
wherein in axially perpendicular cross section each of the first cavity and the second cavity is bounded by inner surfaces of each of an outer wall, an inner wall, and opposite side walls,
wherein each outer wall is positioned radially outward relative to each inner wall,
wherein the inner surfaces of the side walls of the first cavity, and the inner surfaces of the side walls of the second cavity extend parallel to each other and to the radially extending center line, wherein the inner surface of the outer wall of the first cavity is in planar alignment with the inner surface of the outer wall of the second cavity,
wherein the inner wall of the first cavity includes both:
a first curved surface portion adjacent a first side wall of the first cavity, and
a second curved surface portion adjacent a second side wall of the first cavity,
wherein the inner surface of the inner wall of the first cavity is a generally planar wall configured to abuttingly engage the first torque bar and is located between the first curved surface portion and the second curved surface portion of the inner wall of the first cavity,
wherein the inner surface of the inner wall of the first cavity is positioned radially outward further than both the first curved surface portion and the second curved surface portion of the inner wall of the first cavity,
wherein the inner wall of the second cavity includes both:
a first curved surface portion adjacent a first side wall of the second cavity, and
a second curved surface portion adjacent a second side wall of the second cavity,
wherein the inner surface of the inner wall of the second cavity is a generally planar wall configured to abuttingly engage the second torque bar and is located between the first curved surface portion and the second curved surface portion of the inner wall of the second cavity,
wherein the inner surface of the inner wall of the second cavity is positioned radially outward further than both the first curved surface portion and the second curved surface portion of the inner wall of the second cavity,
wherein the first cavity and the second cavity respectively simultaneously receive therein, the first torque bar and the first return spring, and the second torque bar and the second return spring, wherein the first and second torque bars and first and second return springs each extend in the axial direction in the respective first and second cavities and the first return spring biases the backing plate radially outward by operative engagement with the inner surface of the outer wall of the first cavity and the first torque bar, and the second return spring biases the backing plate radially outward by operative engagement with the inner surface of the outer wall of the second cavity and the second torque bar,
wherein at least one inner surface of the side walls of the first cavity is configured to move in guided sliding engagement with the first torque bar in the first cavity, and at least one inner surface of the side walls of the second cavity is configured to move in guided sliding engagement with the second torque bar in the second cavity,
wherein the first torque bar is disposed away from the second torque bar, and
wherein the backing plate is configured to move in guided simultaneous sliding engagement with the first and second torque bars along the center line radially at least one of inward and outward.

9. An apparatus comprising:
an arc shaped backing plate, a first torque bar, a second torque bar, a third torque bar, a first return spring, a second return spring, and a third return spring,
configured to operate in a clutch brake assembly, wherein the clutch brake assembly comprises a pair of annular side plates, a plurality of backing plates including the backing plate arranged in a circular pattern, a plurality of circularly spaced torque bars including the first torque bar, the second torque bar and the third torque bar extending axially between and in fixed operative supported connection with each of the side plates, and an expandable tube operative to cause the backing plate in the assembly to be moved in a radially inward direction relative to the axially extending torque bars,
wherein the backing plate includes a plurality of separated open cavities,
wherein the plurality of open cavities include a first cavity, a second cavity, and an intermediate cavity, each of which first, second and intermediate cavities extend in the axial direction through the backing plate,
wherein the intermediate cavity is located in centered alignment with a radially extending center line of the arc shaped backing plate and is disposed between the first cavity and the second cavity,
wherein in axially perpendicular cross section each of the first cavity, the second cavity, and the intermediate cavity is bounded by inner surfaces of each of an outer wall, an inner wall, and opposite side walls,
wherein each outer wall is positioned radially outward relative to each inner wall,
wherein the inner surfaces of both the inner walls and the outer walls extend in substantially parallel directions, wherein the inner surfaces of the side walls of the first cavity, the second cavity and the intermediate cavity extend parallel to the center line,
wherein the first cavity has extending in the axial direction therein,
the first torque bar, and
the first return spring,
wherein the outer wall of the first cavity receives outwardly directed biasing force by the first return spring operatively engaging the first torque bar and the outer wall of the first cavity,
wherein at least one of the inner surfaces of the side walls of the first cavity is configured to move parallel to the center line in engagement with the first torque bar during radial movement of the backing plate,
wherein at least one of the inner surfaces of the side walls of the first cavity is configured to provide torque transfer to the backing plate therethrough by engagement with the first torque bar,
wherein while the first torque bar and the first return spring extend in the first cavity, the second cavity has extending in the axial direction therein,
the second torque bar, and
the second return spring, wherein the outer wall of the second cavity receives outwardly directed biasing force by the second return spring operatively engaging the second torque bar and the outer wall of the second cavity, wherein at least one of the inner surfaces of the side walls of the second cavity are configured to move parallel to the center line in engagement with the second torque bar during radial movement of the backing plate, wherein at least one of the inner surfaces of the side walls of the second cavity is configured to provide torque transfer to the backing plate therethough by engagement with the second torque bar simultaneously while the at least one of the inner surfaces of the side walls of the first cavity provide torque transfer to the backing plate therethrough by engagement with the first torque bar, wherein while the first torque bar and the first return spring, and the second torque bar and the second return spring, extend in the first and second cavities respectively, the intermediate cavity has extending therein in the axial direction, the third torque bar, and the third return spring, wherein the outer wall of the intermediate cavity receives outwardly directed biasing force by the third return spring operatively engaging the third torque bar and the outer wall of the intermediate cavity, wherein at least one of the inner surfaces of the side walls of the intermediate cavity is configured to move parallel to the center line in engagement with the third torque bar during radial movement of the backing plate.

10. An apparatus comprising:

a backing plate configured for use in a clutch brake assembly, wherein the clutch brake assembly comprises a pair of annular side plates, a plurality of axially extending torque bars in fixed operative connection with each of the side plates, and an expandable tube operative to cause the backing plate when installed in the assembly to be moved in a radially inward direction relative to the axially extending torque bars, wherein the backing plate includes a plurality of open activities, wherein the plurality of open cavities include a first cavity, a second cavity, and an intermediate cavity, wherein the intermediate cavity is located in centered alignment with a radially extending center line of the backing plate and is disposed between the first cavity and the second cavity, wherein in axially perpendicular cross section each of the first cavity, the second cavity, and the intermediate cavity is bounded by inner surfaces of each of a respective outer wall, a respective inner wall, and respective opposite side walls, wherein for each of the first cavity, the second cavity and the intermediate cavity, each respective outer wall is positioned radially outward relative to each respective inner wall, and the inner surfaces of both the inner wall and the outer wall extend in substantially parallel directions, wherein the inner surfaces of each of the side walls of each of the first cavity and the second cavity extend parallel to the center line, wherein the inner wall of the first cavity in axially perpendicular cross section includes both:

a first curved surface portion adjacent a first side wall of the first cavity, and a second curve surface portion adjacent a second side wall of the first cavity;

wherein the inner surface of the inner wall of the first cavity includes a generally planar first surface located between the first curved surface portion and the second curved surface portion of the inner wall of the first cavity, wherein the planar first surface of the inner wall of the first cavity is positioned radially outward further than both the first curved surface portion and the second curved surface portion of the inner wall of the first cavity, wherein the inner wall of the second cavity in axially perpendicular cross section includes both:

a first curved surface portion adjacent a first side wall of the second cavity, and a second curved surface portion adjacent a second side wall of the second cavity;

wherein the inner surface of the inner wall of the second cavity includes a generally planar second surface located between the first curved surface portion and the second curved surface portion of the inner wall or the second cavity, wherein the planar second surface of the inner wall of the second cavity is positioned radially outward further than both the first curved surface portion and the second curved surface portion of the inner wall of the second cavity, wherein the planar first surface and the planar second surface are in planar alignment, wherein the first cavity is sized to receive therein, a first torque bar of the plurality of torque bars, wherein the first cavity is sized to receive therein, at least part of a first return spring associated with the first torque bar, wherein the outer wall of the first cavity is configured to engagingly receive outwardly directed biasing force from the first return spring, wherein the planar first surface is configured to abuttingly engage the first torque bar, wherein at least one of the inner surfaces of the side walls of the first cavity is configured to move in sliding engagement with the first torque bar parallel to the center line during radial movement of the backing plate in the clutch assembly, wherein the at least one of the inner surfaces of the side walls of the first cavity is configured to provide torque transfer therethrough by engagement with the first torque bar, wherein the second cavity is sized to receive therein, a second torque bar of the plurality of the torque bars, while the first torque bar is received in the first cavity, wherein the second cavity is sized to receive therein, at least part of a second return spring associated with the second torque bar, wherein the outer wall of the second cavity is configured to engagingly receive outwardly directed biasing force from the second return spring, wherein the planar second surface is configured to abuttingly engage the second torque bar, wherein at least one of the inner surfaces of the side walls of the second cavity is configured to move in sliding engagement with the second torque bar parallel to the center line during radial movement of the backing plate in the clutch assembly, wherein the at least one of the inner surfaces of the side walls of the second cavity is configured to provide torque transfer therethrough by engagement with the second torque bar while the at least one of the inner surfaces of the side walls of the first cavity provides torque transfer therethrough by engagement with the first torque bar.

\* \* \* \* \*